(No Model.) 5 Sheets—Sheet 1.

G. N. TODD.
COTTON HARVESTER.

No. 285,856. Patented Oct. 2, 1883.

Witnesses:
Jas. F. Duhamel
Walter S. Dodge

Inventor:
George N. Todd,
by Dodge Son,
Attys.

(No Model.)  5 Sheets—Sheet 3.

G. N. TODD.
COTTON HARVESTER

No. 285,856.  Patented Oct. 2, 1883.

Witnesses:
Jas. F. DuHamel
Walter S. Dodge.

Inventor:
George N. Todd,
by Dodgerson,
Attys.

(No Model.) 5 Sheets—Sheet 4.

G. N. TODD.
COTTON HARVESTER.

No. 285,856. Patented Oct. 2, 1883.

Witnesses:
Jno. F. DuHamel
W. S. Dodge

Inventor:
George N. Todd,
by Dodge Son,
Attys.

(No Model.) 5 Sheets—Sheet 5.
G. N. TODD.
COTTON HARVESTER.
No. 285,856. Patented Oct. 2, 1883.
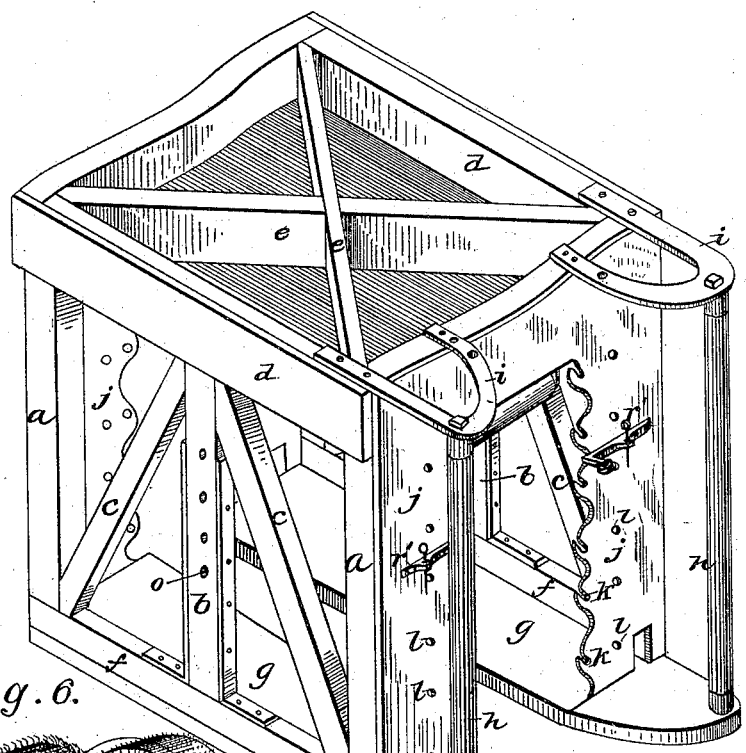
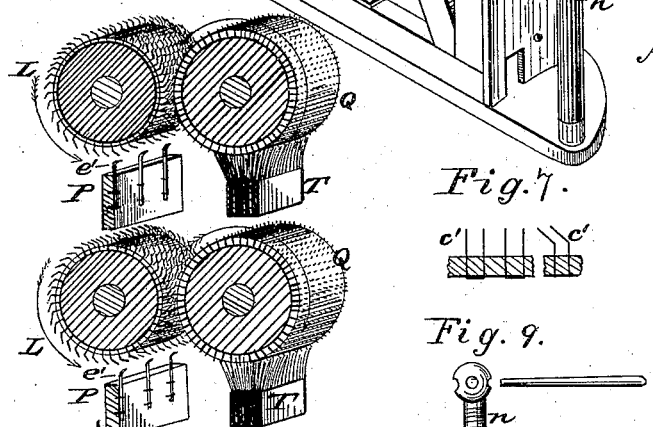
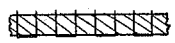
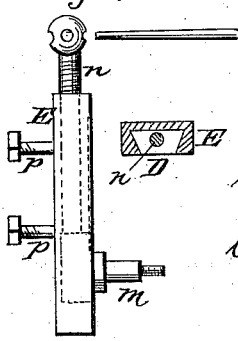
Witnesses:
Jas. F. DuHamel
W. S. Dodge
Inventor:
George N. Todd,
by Dodge & Son,
Attys.

UNITED STATES PATENT OFFICE.

GEORGE N. TODD, OF FORT SMITH, ARKANSAS.

COTTON-HARVESTER.

SPECIFICATION forming part of Letters Patent No. 285,856, dated October 2, 1883.

Application filed June 8, 1883. (No model.)

*To all whom it may concern:*

Be it known that I, GEORGE N. TODD, of Fort Smith, in the county of Sebastian and State of Arkansas, have invented certain Improvements in Cotton-Harvesters, of which the following is a specification.

My invention relates to cotton harvesters and pickers, and is designed as an improvement upon those for which Letters Patent were issued to me bearing date the 3d day of April, 1883, and numbered 275,094, to which reference is hereby made for any explanation of details not found herein.

The present invention consists in various improvements, hereinafter more fully pointed out and claimed; but I would here remark that in the general principles of its operation it is quite similar to the machines previously patented by me, having a frame adapted to straddle the row of plants, two series of horizontal revolving picker-cylinders arranged to form two converging walls which pass on opposite sides of the cotton-plants, strippers for removing the cotton from the picker-cylinders, and other features of general resemblance, as will be more fully explained.

Figure 1:
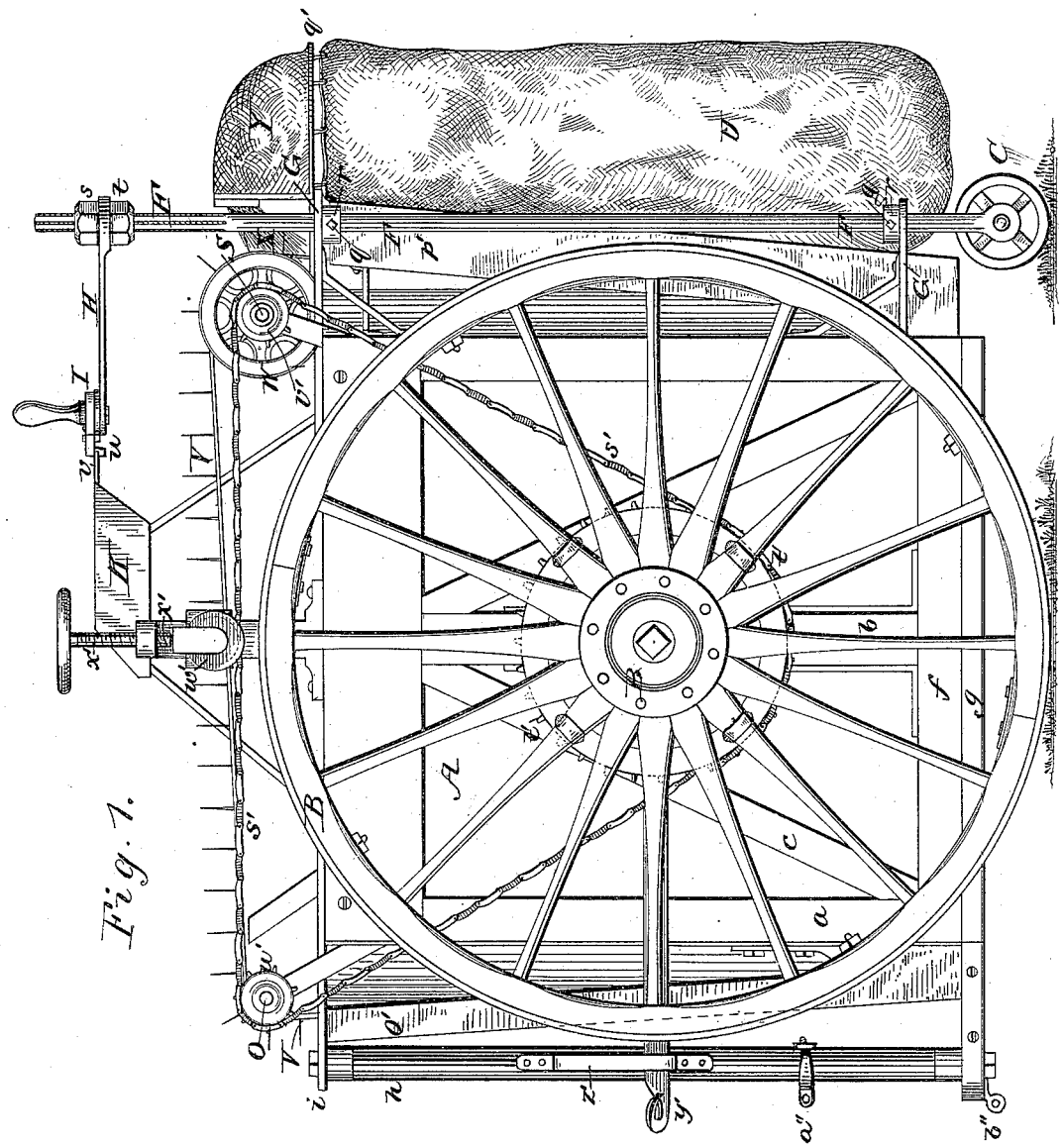
Figure 2:
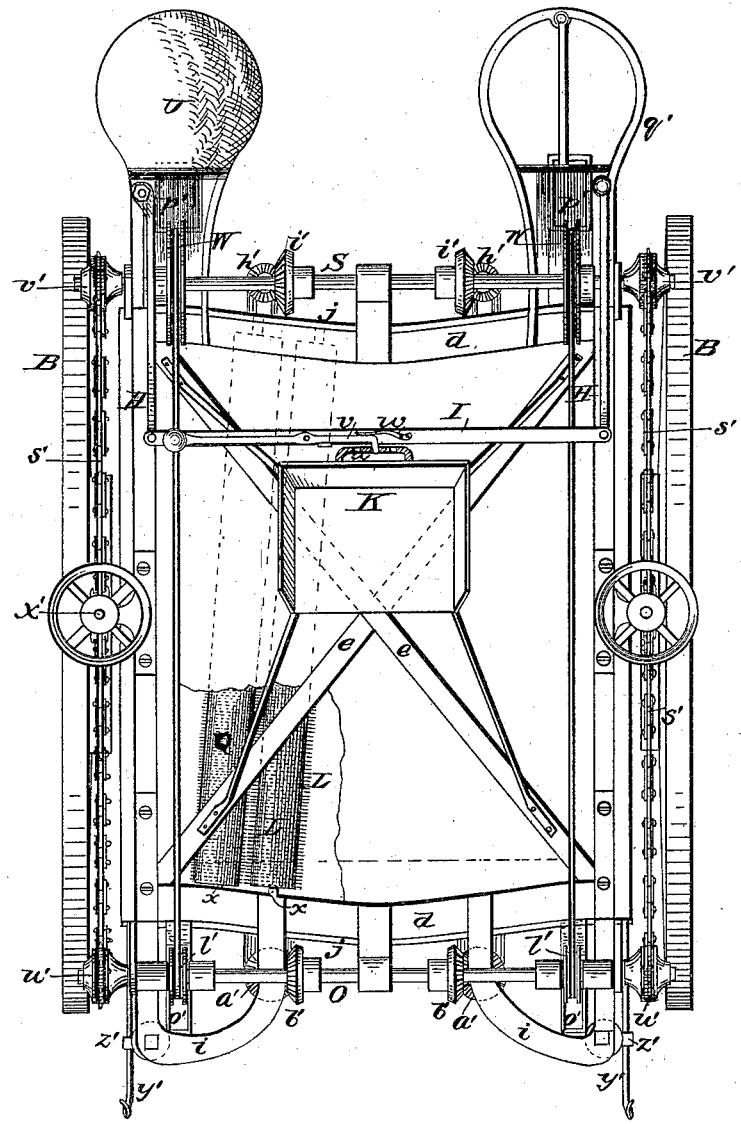
Figure 3:
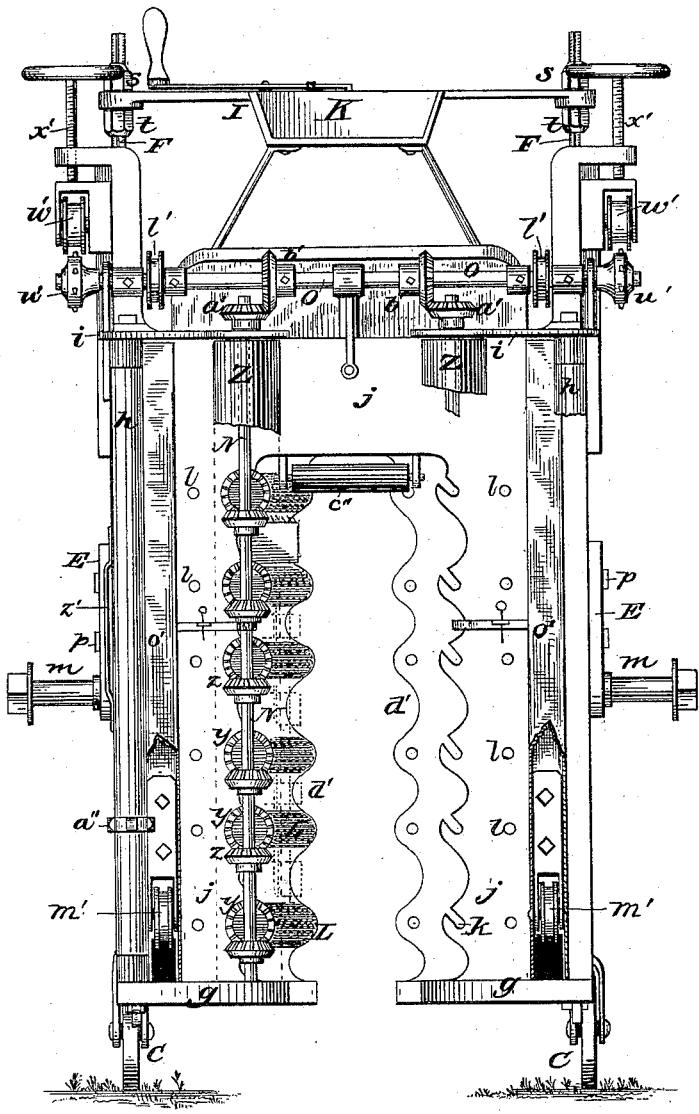
Figure 4:
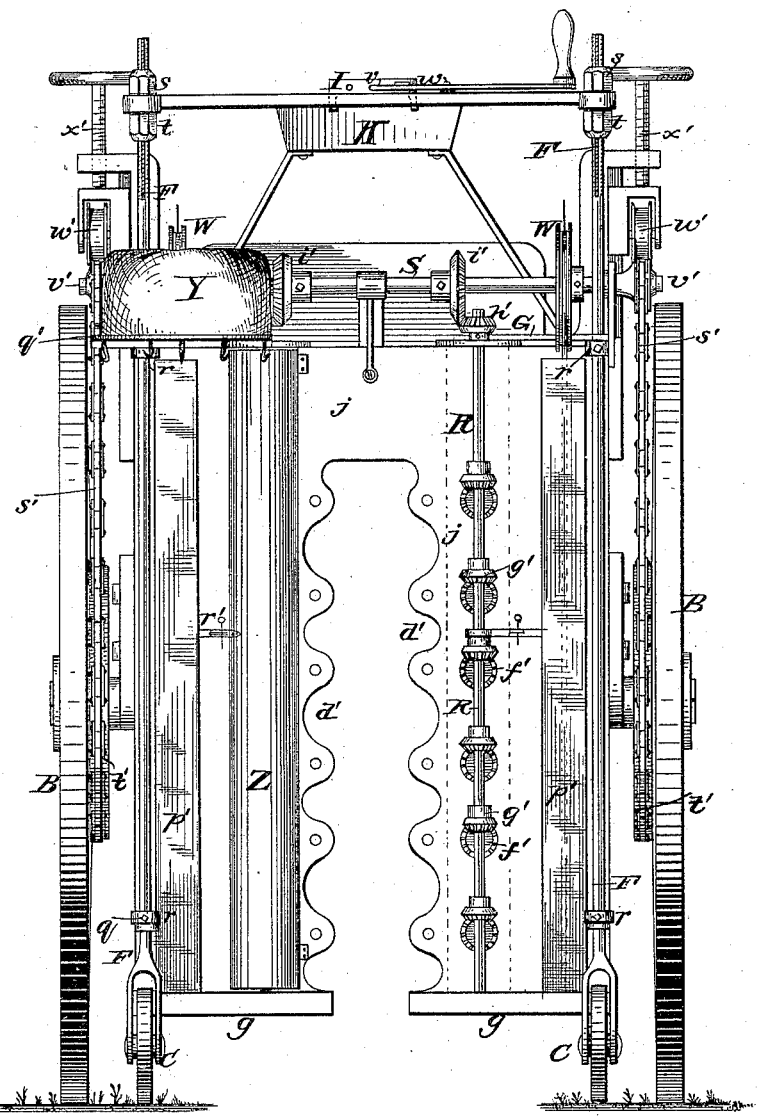

In the accompanying drawings, Figure 1 represents a side elevation of my improved machine; Fig. 2, a top plan view of the same; Fig. 3, an end elevation, looking from the front, portions being broken away or detached to show more clearly the construction and arrangement of parts; Fig. 4, a rear end elevation, also having certain parts removed to show parts concealed thereby. Fig. 5, a perspective view of the main frame of the machine; Fig. 6, a sectional perspective view illustrating the construction, arrangement, and mode of operation of the picking-cylinders, guards, cleaning-cylinders, and brushes; Figs. 7 and 8, views illustrating the material used for clothing the picking and cleaning cylinders; Fig. 9, a view illustrating the manner of adjusting the main carrying-axles of the machine; Figs. 10 and 11, perspective views of two different forms of conveyer, one showing flat blades and the other metal teeth applied to a belt or band.

The purpose of the present invention is primarily to cheapen the construction of machines of this class, the machines heretofore patented by me being found to give good results in actual use; but in various particulars I am also enabled to improve the action of the machine.

To secure efficient operation and adapt the machine for long-continued use, it is necessary, in the first place, to provide a strong and rigid frame, because, being necessarily unsupported from side to side from the ground to the top, the frame is liable to be severely racked and twisted. To avoid this difficulty I construct the frame as shown in Fig. 5, in which A represents the frame as a whole, composed of four vertical corner posts, *a*, and middle side posts, *b*, braced by diagonal braces, *c*, and supporting at their upper ends a rectangular top frame, *d*, which is firmly braced and stiffened by diagonals *e*, running from corner to corner and crossing at the center, as shown. The lower ends of the side posts, *a* and *b*, rest upon sills *f*, beneath which are inwardly-extending horizontal platforms *g*, each extending forward in advance of the upright corner posts. These platforms are of gradually-decreasing width from their rear to their forward ends, being separated at the rear only a sufficient distance to permit the stalks of the cotton-plants to pass readily between them, the space gradually widening, however, toward the front end, and the inner sides of the platform being rounded outward at the front, as shown, to give a wide entrance for the plants, and to cause them to enter and to pass freely into the converging passage-way.

At or near the forward points or extremities of the platforms *g* are placed vertical cylinders or posts *h*, supported at their lower ends by the platforms, and at their upper ends by overhanging brackets or supports *i*, secured to the top of frame A. These posts are designed to draw together the branches or limbs of the plants and facilitate their passage into the frame A, where they pass between picking-cylinders, as presently explained.

Across the front and rear of frame A are bolted or otherwise secured iron plates *j*, which are cut out at the middle to form a passage-way for the plants, but extend across the top of the frame from side to side at the top, and thence down to the platforms *g* at each side, substantially the same width as the platforms at that point. These plates give great stiffness and rigidity to the frame from side to side, notwithstanding the separation of the two sides from the bottom almost to the extreme top. The front plate is provided with a series of notches or slots, k, to receive the journals of the picking-cylinders, and with a series of perforations, l, to receive the journals of the stripping or cleaning cylinders, as plainly shown in Figs. 3 and 5, and the rear plate is furnished with two series of perforations for the same purpose. The plates j are backed or faced with wood, which is rounded off at the edges, to prevent injury to the plants. The frame thus constructed possesses great strength, and is admirably adapted for the purpose for which it is designed. This frame is supported, primarily, by two large carrying-wheels, B, which also serve as driving-wheels for imparting motion to other parts of the machine, each wheel driving the machinery of that half or side of the frame to which it is applied, and it is further supported and is guided by smaller rear rudder-wheels, C, as more plainly indicated in Fig. 1, there being somewhat more weight in rear of the axles of the wheels B than in advance thereof.

It is desirable, in order to adapt the machine to different ground and different crops, that the frame be adjusted vertically, so that the platform g and the picking-cylinders may be brought to the proper elevation under all circumstances. I therefore form the axles m of both the main wheels B upon sliding blocks D, which are arranged to move vertically in guides or boxes E, bolted to the middle side posts, b, of the frame A, and I provide for each block a screw-stem, n, which passes through a threaded hole in the upper end of the guide or casting E and bears at its lower end upon the block D. The screw-stems have their upper ends adapted to receive a wrench or other tool for turning them, and by being turned raise or lower the frame upon the axles m, as required, the axles, of course, being supported in the wheels B. As another mode of making this adjustment, the side posts, b, may be furnished with a series of holes, o, to receive the bolts p, by which the guides E are secured to the frame, so that by placing the bolts in one or another pair of holes the height of the frame from the ground may be varied.

The rear supporting and guiding wheels, C, are each carried in the forked lower end of a vertical standard or post, F, passing through rearwardly-projecting arms G, secured to the frame, the vertical adjustment of the wheels being effected by loosening the set-screws q of collars r, encircling the standard F, and placed above and below the respective arms G, moving said collars up or down, and again tightening the set-screws. Each standard F is squared and threaded at its upper end, and furnished with a tiller-arm, H, which may be raised and lowered and held at any desired height, as the adjustment of the wheels C may require, by means of nuts s t above and below the arm, as indicated in Fig. 1. The arms H of the two standards are connected by a crossbar, I, so that both shall move in unison, and thereby cause the two wheels C to stand always in the same direction in line with or at the same angle relatively to the travel of the machine. Ordinarily the machines will travel in a straight line, following the ridge or row in which the plants stand, and I therefore provide the bar I with a locking-dog, u, pressed into engagement with a rack or perforated plate, v, at the back of the driver's seat K by a spring, w, and thereby serving to prevent movement of bar I, and consequently of arms H and wheels C.

Having now described the construction of the frame, and the manner in which it is supported, adjusted, and guided, I will now proceed to describe the mechanism which it carries.

Referring now to Figs. 1 and 2, L L indicate two series of picker-cylinders, each provided with journals x, which at the forward end of the cylinders are seated in the slots or notches k of plate j, and at their rear ends pass through the perforations of the corresponding rear plate, the forward ends being furnished with beveled pinions y, which mesh with like pinions, z, on vertical line-shafts N, which in turn are furnished at their upper ends with bevel-pinions a', meshing with like pinions, b', on a cross-shaft, O, running across the top of frame A. By reason of the forward bearings being made in the form of open slots, as shown in Figs. 3 and 5, the picker-cylinders may be readily lifted out, whenever it becomes desirable to do so, upon removing the shields or guards which cover them.

Heretofore I have employed rotary brushes to perform the picking operation; but although such brushes give very good results, I find that a toothed cylinder is very much better adapted to the work, and I also find the best and most convenient form of toothed surface to be produced by the use of card-clothing, which, as is well known, consists of a backing of leather, cloth, or rubber, provided with a large number of stiff fine wire teeth bent forward at an angle to the face of the backing in the direction in which the surface is to travel, or in some cases left straight. The card-clothing is cut to proper size and secured upon a central core or cylinder of wood or like material, as more plainly indicated in Fig. 6, thus producing a cheap and at the same time a durable and most efficient cylinder for the purposes for which it is designed.

The teeth c', Fig. 7, are all of uniform length, and consequently the cylinder has a uniform and regular surface, although formed of a great number of fine teeth or points arranged side by side. Any matter of a linty or loose fibrous nature coming into contact with this surface will adhere thereto and be seized hold of thereby; but any substance or body having a hard surface or an extended face will merely rest upon the points or ends of the teeth, and, being unable to enter between them, will simply fall away from the cylinder as it revolves. In this way the cylinders effect a separation of the cotton fiber from leaves, sticks, and other foreign matters, seizing hold of the fibrous cotton and withdrawing it from the ripe and open bolls, but rejecting the green bolls, leaves, stems, &c. In actual operation this discrimination or selection of the cotton fiber and rejection of other matters is very perfectly performed.

As before stated, the central passage-way through the machine is wide at the forward end, and the inner walls of the passage-way are formed of the horizontal picking-cylinders, arranged one above another, as shown in Fig. 3, it being of course understood that both sides of the passage-way are similarly provided.

The end plates, $j$, in which are formed the journal-bearings for the picking-cylinder, are cut away between said bearings, as at $d'$, causing the edge of the plate at each side of the passage-way to present a serpentine line, as clearly seen in Figs. 3 and 5. By thus cutting away the plates I secure at the forward end a wide space for the entrance of limbs and branches, and at the rear end, where the space is much more contracted, I secure a wide exit for the same, at the same time causing the branches or limbs to pass between the individual picking-cylinders of each side or wall of the passage-way. This provision not only causes the limbs or branches to be more uniformly and certainly brought into position for the picking-cylinders to operate efficiently upon the bolls of each, but it prevents the danger of breaking or uprooting the plants.

To prevent branches or limbs from passing through the walls of the passage-way and into the space beyond, I place beneath each picking-cylinder a guard, P, which fills the space between the cylinders, with the exception of about an inch at the top and proper clearance at the bottom to prevent interference with the roll or cylinder. Along its top edge the guard is furnished with backwardly-curved prongs or teeth $e'$, ordinarily placed about two inches apart, said teeth being designed to prevent the passage of leaves, sticks, branches, or any like foreign matters which may cling to the cylinder, and which otherwise would be carried over the guards with the cotton, which latter freely passes through between the teeth or prongs.

Directly in rear of each picking-cylinder is arranged a stripping or clearing cylinder, Q, clothed, preferably, with material similar to the card-clothing, but with much shorter and preferably straight teeth. These cylinders are provided with central shafts or axles, the journals of which are carried in the bearings $l$ in the end plates, $j$, as indicated in Fig. 3, and their rear ends are furnished with bevel-pinions $f'$, which mesh with pinions $g'$, secured by set-screws upon vertical line-shafts R, the upper ends of which are furnished with bevel-pinions $h'$, to mesh with like pinions, $i'$, secured upon a cross-shaft, S, running across the top of the frame A, parallel with and in rear of shaft O. The gearing is so arranged that the picking-cylinders and the stripping or clearing cylinders rotate in reverse directions, preferably traveling upward at their point of contact, and by preference the stripping or cleaning cylinder is made to rotate more rapidly than the picking-cylinder, to insure a proper clearing action. It will be seen that with the rolls arranged to travel as indicated the clearing-teeth move past the picking-teeth in the direction in which they are inclined, and consequently sweep the cotton fiber therefrom with ease and certainty. The short wire teeth of the stripper-cylinders are peculiarly adapted to the work of removing the cotton from the picking-cylinders, because perfectly unyielding, yet producing a surface so rough that the cotton adhering to and projecting from the face of the picker-cylinders is readily and with certainty taken up by the clearing-cylinders, and because, being short and smooth, they permit the cotton to fall or to be readily removed from them, they being found to answer much better than bristles. Most of the cotton taken up by the short teeth of the stripping or clearing cylinders falls therefrom as it reaches the rear or descending side; but for the purpose of removing such of the cotton as may remain upon the cleaning or stripping cylinders brushes or wipers T are arranged beneath them, or in other convenient position, to act upon their surfaces, as shown in Fig. 6. The cotton removed from the stripping or clearing cylinders falls down upon the platforms $g$, which also receive any cotton dislodged by shaking or otherwise from overripe bolls. From the platform G the cotton is delivered to bags or receptacles U by traveling conveyer belts or bands V, which may be armed with flat blades or floats $j'$, as in Fig. 10, or, as is preferred, with wire teeth or prongs $k'$, as in Fig. 11, the latter being curved backward at their points, if desired, to facilitate the detachment of the cotton therefrom at the delivery-point, the floats or teeth $f$ dragging the cotton along said platforms and finally elevating it to the receptacles. The bands V are flat and pass about pulleys W, $l'$, $m'$, and $n'$, the pulleys W being rigidly secured upon the cross-shaft S, and serving to impart motion to the conveyers as the machine travels forward. The pulley-grooves have flat faces, to prevent the turning or twisting of the bands. The conveyer-belts pass along the top of the machine from the rear to the front, and thence downward through or within trunks $o'$, and through openings in the front plate, $j$, backward along the platforms $g$, and upward again through trunks or spouts $p'$, to the pulleys W. Just as the conveyers approach the pulleys W their prongs or blades come in contact with and are swept by brushes or wipers X, which remove adhering cotton therefrom and discharge it into bags U or other receptacles, the mouths of which are arranged in convenient position to receive it. The brushes may be either fixed or revolving, and may in some cases be omitted, the cotton falling from the teeth by its own weight, particularly when the backwardly-curved teeth or blades are used. A hood or guard, Y, is arranged above the receptacle to prevent the cotton from flying out or escaping, and its frame $q'$ is furnished with hooks, by which to suspend the bag or receptacle U.

To prevent the branches or limbs of plants, as well as dust and dirt, from entering between the teeth of the gearing by which the picking and clearing cylinders are rotated, I provide guards or shields Z therefor, hinging the same to the end plates, $j$, and providing them with suitable fastenings, $r'$, so that they may be readily swung back or removed to give access to the gearing.

Motion is given to the various parts by means of driving-chains $s'$, passing about sprocket-wheels $t'$, secured to or formed upon the main wheels B, and also passing over and around sprocket-wheels $u'$ and $v'$, secured upon the cross-shafts O and S. As these chains are liable to become somewhat loose with wear, and more particularly because the adjustment of the main supporting-axles $n$ varies with the tension of the chains, I provide a band or chain tightener for each chain, which consists of a grooved pulley, $w'$, bearing upon the chain, and carried by a yoke provided with a screw-stem, $x'$, by which the pressure of the pulleys upon the chain, and the consequent tension of the chains, can be readily regulated and controlled under all adjustments of the frame and axles.

The machine is drawn, when in operation, by means of draw rods or bars $y'$, the outer ends of which are provided with hooks for the attachment of a single-tree or double-tree, as required. These rods or bars are journaled upon the axles $m$, and their forward ends are free to move in a vertical plane, the motion being limited by metal straps or guides $z'$. This arrangement permits the frame A to rock upon the axles $n$, to follow the undulations of ground, without in any way affecting the draw-rods, and without being affected by the draft of the team.

For the purpose of transporting the machine from place to place, the posts or uprights $h$ are furnished with eyes or clips $a''$, to which ordinary poles may be attached, chains being carried downward from the poles, and attached to eyes or clips $b''$ at the lower extremities of the posts $h$, or at the under side of the platform $g$.

The cross-shafts O and S are divided at their middle, so that each half or section is independent of the other; hence it will be seen that, being independently driven, each side of the machine is free to operate wholly independent of the other, and either may continue to operate, even when the other from any cause stops.

I desire here to have it understood that I do not claim herein rotary brushes for brushing the cotton from the bolls, but picking-cylinders armed with teeth, which hook into and draw the cotton from the bolls, in contradistinction to brushing it therefrom. The action is essentially different and much more efficient, besides which fact the rejection of all leaves and like foreign matter is of great importance, materially lessening the subsequent cleaning operations.

A roller, $c''$, is arranged across the top of the middle passage-way, as before, to bend down such plants as are too tall to pass under and clear of the roller.

The teeth of the picking-cylinder may be either straight or inclined, though the inclined teeth are preferred.

I am aware that long wire points have been used on cotton-picker cylinders, such teeth being carried by an elastic backing, and thereby adapted to yield in meeting with any material resistance, the action being essentially the same as the bristle brushes, which are described as the equivalent of such yielding wire points. The card-clothing used in my machine is the same as that commonly used in carding-machines, the teeth being short and inelastic, or practically so, whether the backing be of leather, rubber, or other material, for where rubber backing is used webbing is introduced into the rubber, which is thus made inelastic, or substantially so. Elasticity would destroy the action aimed at, and consequently the teeth or points must be short, and this, also, for the further reason that the long teeth would so separate at their outer ends when applied to the cylindrical roll that the desired close-bodied surface necessary to the peculiar action described could not be produced thereby.

I am also aware that long-toothed material made after the manner of card-clothing has been used for stripping or cleaning cylinders, and such use I disclaim; but I do not use the long teeth, nor do I use the material for the stripping or clearing cylinders.

Having thus described my invention, what I claim is—

1. The herein-described frame, consisting of trussed top and sides connected by metal end plates, $j$, perforated to form bearings for the picking and clearing cylinders, as shown and described.

2. In a cotton harvester or picker, a frame consisting of vertical timbers $a$ $b$, diagonal braces $c$, top frame, $d$, provided with braces $e$, sills $f$, platforms $g$, and end plates, $j$, cut away at the middle to form a passage-way for plants, substantially as shown and described.

3. In combination with the side frames of a cotton picker or harvester, metallic connecting end plates, $j$, cut away at the middle to form a passage-way for plants, and provided with seats or bearings for the journals of picking-cylinders, substantially as shown and described.

4. In a cotton-picking machine substantially such as described, a frame provided with end plates, $j$, cut out at points between the journal-bearings of the picking-cylinders, substantially as shown and described, whereby free space is afforded for the entrance and exit of limbs or branches of plants.

5. In combination with picking-cylinders L, guards P, provided on their upper edge with teeth or prongs, substantially as and for the purpose set forth.

6. In combination with picking-cylinders L, intermediate guards, P, adapted to prevent the entrance of branches and twigs, and provided on their upper edges with backwardly-turned teeth or prongs $e'$, to intercept leaves and like foreign matter, while permitting the cotton to pass between them.

7. In combination with picking-cylinders L, covered with wire card-clothing, the stripping-cylinders Q, provided with short metal teeth, substantially as shown and described.

8. In a cotton harvester or picker substantially such as described, the combination of picking-cylinders L, guards P, provided with teeth $e'$, stripping-cylinders Q, and brushes T, all combined and arranged to operate substantially as explained.

9. In a cotton-picker substantially such as described and shown, the combination of frame A and its main carrying-wheels B and supplemental carrying-wheels C, carried by swiveled standards F, whereby the machine may be guided as required, and means, substantially such as shown and described, for adjusting the frame vertically relatively to said wheels.

10. In combination with a cotton-harvester frame, wheels B C, and standards F, provided with arms H, connecting-bar I, provided with locking-dog $u$ and rack $v$, all arranged to operate substantially as explained.

11. In combination with frame A and carrying-wheels B, supplemental wheels C, carried by adjustable standards F, and arms H, vertically adjustable upon said standards, whereby they may be kept at the proper height under all adjustments of the standards.

12. In combination with frame A, provided with wheels B and arms G, standards F, passing through said arms, and provided with collars $r$, and with wheels C at their lower ends, all substantially as shown and described.

13. In combination with frame having posts $h$, eyes or clips $a''$ $b''$, applied substantially as shown, and for the purposes described.

14. In combination with the vertically-adjustable frame A, driving-wheels B, cross-shafts O S, vertical shafts N, and horizontal picking-rolls L, driving-chains $s'$, and chain-tighteners, all arranged substantially as shown.

GEO. N. TODD.

Witnesses:
WILLIAM W. DODGE,
WALTER S. DODGE.